United States Patent [19]

Klempner et al.

[11] 4,414,174

[45] Nov. 8, 1983

[54] REACTION INJECTION MOLDING COMPOSITIONS AND PROCESS

[75] Inventors: Daniel Klempner, Farmington Hills; Kurt C. Frisch, Grosse Ile, both of Mich.

[73] Assignee: American Cyanamid Company, Stamford, Conn.

[21] Appl. No.: 372,897

[22] Filed: Apr. 29, 1982

[51] Int. Cl.$^3$ .......................... B29B 1/24; B29F 1/00; C08G 18/38
[52] U.S. Cl. ............................ 264/328.6; 264/328.16; 264/328.2; 528/73
[58] Field of Search .................. 521/166, 118; 528/73; 264/328.16, 328.2, 328.6

[56] References Cited

U.S. PATENT DOCUMENTS

| | | | |
|---|---|---|---|
| 4,139,501 | 2/1979 | Rudner et al. | 521/136 |
| 4,301,110 | 11/1981 | Cuscurida et al. | 264/328.14 |
| 4,369,258 | 1/1983 | Johnson | 521/166 |

*Primary Examiner*—H. S. Cockeram
*Attorney, Agent, or Firm*—Steven J. Hultquist

[57] ABSTRACT

Replacement of one-third to two-thirds of the short chain diols in a polyisocyanate/polymeric polyol/short chain diol molding composition with a hydroxyalkylmelamine provides shaped articles of increased high temperature stiffness and reduced heat sag. The hydroxyalkylmelamine is strongly catalytic for the isocyanatepolyol reaction.

6 Claims, No Drawings

REACTION INJECTION MOLDING COMPOSITIONS AND PROCESS

This invention relates to novel compositions useful in injection molding techniques involving reaction of the ingredients. More particularly, this invention relates to such compositions comprising a multi-functional isocyanate, a polyol extender, and a hydroxyalkyl melamine.

A major use of urethane chemistry is to produce elastomers by reaction injection molding techniques. These elastomers are conveniently obtained by reacting a liquid diisocyanate stream with a liquid polyol stream in a heated mold under moderate pressure and in the presence of a catalyst. The resulting shaped article exhibits desirable properties for many applications.

In many applications, it is desirable that the molded article possess low heat distortion and high flexural modulus at high temperatures. The heat distortion temperature and flexural modulus of the conventional diisocyanate-polyol elastomers obtained by reaction injection molding are not as high as is desired for many applications and improvements in these properties have long been desired.

Previous attempts to obtain good stiffness at high temperature involved the addition of chopped glass fibers to the molding compositions as reinforcement. This requirement for reinforcing agent adds to the complexity of the formulating and molding operations and is undesirable.

In addition, use of organo-metallic catalysts to promote the reaction of diisocyanate with polyols and diols can result in migration of the catalyst to the surface of the molded object where it creates odor and toxicity problems.

Accordingly, it would be desirable to provide a polyurethane elastomer of good stiffness at high temperatures without the need for added reinforcing agent and, without the need for potentially toxic catalysts to promote the reaction during injection molding. The provision for such elastomers would fulfill a long-felt need and constitute a notable advance in the art.

In accordance with the present invention, there is provided a reaction injection molding composition comprising a polyisocyanate, a polymeric polyol, a short chain diol and a hydroxyalkylmelamine, the total hydroxyl content of the polymeric polyol, the short chain diol, and the hydroxyalkylmelamine being about equal to the stoichiometric requirements of said isocyanate, up to an isocyanate index of about 300 the polymeric polyol comprising the major weight proportion of the combination of polymeric polyol, short chain diol and hydroxyalkylmelamine, and said hydroxy-alkylmelamine comprising from about one-half to about twice the weight content of short chain diol.

By polymeric polyol is meant any long-chain hydroxy terminated resin which in the finished polyurethane constitutes the soft-segment portion of the polymer as is understood by those skilled in the art. By short chain diol is meant the chain extender part of the polyurethane formulation which through reaction with the isocyanate forms the hard-segment portion of the final polymer. It is further understood that reaction injection molding composition as understood herein may also contain a minor proportion of other multifunctional polyols other than short-chain diols such as trimethylolpropane and the like.

There is also provided a process for manufacturing a shaped article which comprises preparing a reactive mixture of a diisocyanate, a polymeric polyol, a short chain diol and a hydroxyalkyl melamine wherein the total hydroxyl content of the polymeric polyol, the short chain diol and the hydroxyalkylmelamine is about equal to the stoichiometric requirements of the diisocyanate, the polymeric polyol comprises the major weight portion of the combination of polymeric polyol, short chain diol and hydroxyalkylmelamine, and the hydroxyalkylmelamine comprises from about one-half to about twice the weight content of said short chain diol, shaping and reacting said mixture in a heated mold under pressure, and, if desired, post-curing the shaped article.

Use of the hydroxyalkylmelamine in place of a portion of the short chain diol normally employed in the molding composition results in a shaped article having increased stiffness (flexural modulus) at high temperature and reduced heat sag. The use of the hydroxyalkylmelamine eliminates the need for an added catalyst and provides very fast cure times which are highly desirable for reaction injection molding.

In carrying out the present invention, the components used to prepare the reaction injection molding composition are the same as those conventionally employed except for the provision of the hydroxyalkylmelamine. Thus, the useful polyisocyanates, polymeric polyols, and short chain diols are well known to those skilled in the art and do not require further detailed description herein. Conventional compositions used in the art comprise a polyisocyanate and a combination of polymeric polyol and short chain diol, the total hydroxyl content of which is about equal to that of the polyisocyanate up to an isocyanate index of about 300. The conventional composition will also comprise a catalyst, such as an organo-metallic compound. The resulting composition will contain a major proportion of polymeric polyol as the hydroxyl-containing component.

It is further understood that by conventional composition is meant a reaction injection moldable composition which through choice of catalyst and isocyanate to hydroxyl ratio will produce a cured article containing isocyanurate groups as well as polyurethane hard segments. Thus, although compositions in which the isocyanate to hydroxyl ratio is about one are more commonly employed, it is well known that increasing this ratio can be beneficial in some cases and this is considered within the scope of this invention.

In accordance with the present invention, part of the normal content of short chain diol is replaced by a hydroxyalkylmelamine, the incorporation of which usually eliminates the need for any added catlyst. Generally, the hydroxyalkylmelamine will replace from about one-third to two-thirds of the amount of short chain diol normally employed. Stated alternatively, the hydroxyalkylmelamine will comprise from about one-half to about twice the weight content of short chain diol conventionally employed.

Suitable hydroxyalkylmelamines have the general formula:

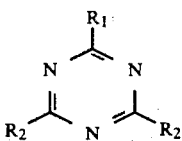

wherein $R_1$ is $C_1$–$C_8$ linear or branched chain alkyl, aryl, $NH_2$, or equal to $R_2$ where $R_2$ is selected from $NH_2$, $NHCH_2CH_2OH$,

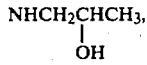

$NHCH_2CH_2CH_2OH$, and $NHCH_2CH_2CH_2CH_2OH$ and at least one of said $R_2$'s is a hydroxyalkylamine group. Preferably both $R_2$ groups are hydroxyalkylamine groups and $R_1$ is $NH_2$ or a hydroxyalkylamine group. These compounds are generally in the form of mixtures in which the individual species vary as to the number of hydroxyalkylamine groups they contain. For convenience, the hydroxyl number of the hydroxyalkylmelamine composition is determined and this number indicates the nature of the mixture. The hydroxyl number is the number of milligrams of potassium hydroxide equivalent to the hydroxyl content of 1.0 gram of polyol. Preferred mixtures generally contain on the average about two to three hydroxyalkyl substituents per triazine ring.

In preparing the molding composition, the polymeric polyol, the short chain diol and the hydroxyalkylmelamine are thoroughly mixed and degassed. The polyisocyanate is then added with high-speed stirring and the resulting mixture is immediately poured in a pre-heated mold and placed in a press at elevated temperature under suitable pressure. Curing of the composition in the mold and subsequent post-curing will be in accordance with conventional procedures.

In addition to the unexpected benefits in stiffness at high temperatures of the molded compositions and in the elimination of the need for added catalyst, the hydroxyalkylmelamine can also reduce the flammability of the molded composition.

The invention is more fully illustrated in the examples which follow wherein all parts and percentages are be weight.

COMPARATIVE-EXAMPLE

A molding composition of the following amounts of ingredients is prepared:

| Material | Parts |
| --- | --- |
| Modified diphenylmethane diisocyanate[1] | 98 |
| Polymer polyol[2] | 70 |
| Short chain diols[3] | 30 |
| Dibutyltin dilaurate[4] | 2.4 |

Notes:
[1] Isonate 191, Upjohn, isocyanate index 105.
[2] Niax 3128, Union Carbide
[3] Niax 1180, Union Carbide
[4] T-12, M and T Chemicals All components except the diisocyanate are thoroughly mixed and degassed. The diisocyanate is added with high-speed stirring (10–20 seconds at 5,000 rpm). The mixture is immediately poured into a pre-heated mold and the mold is placed in a press under 15,000 psi for 5 minutes at 100° C. The molded samples are removed from the mold and post-cured at 120° C. for 1 hour. The samples are conditioned for one week at room temperature and 50% relative humidity prior to testing. Properties of the resulting elastomer are given in TABLE I.

EXAMPLE 1

Following the procedure of the comparative example, a molded elastomer is prepared from the following composition:

| Material | Parts |
| --- | --- |
| Modified diphenylmethane diisocyanate[1] | 72.4 |
| Polymer diol[2] | 70 |
| Hydroxypropylmelamine[5] | 15 |
| Short chain diols[3] | 15 |

Notes:
[1], [2], and [3], see comparative example
[5], hydroxyl number = 570

Properties of the resulting elastomer are also given in TABLE I.

TABLE I

Comparison of Conventional and Melamine Polyol Elastomers

| | Comparative Example | Example 1 |
| --- | --- | --- |
| Processing | | |
| Pot Life, sec. | 65 | 15 |
| Cure Time, min/°C. | 5/100 | 5/100 |
| Post Cure, min/°C. | 60/120 | 60/120 |
| Physical Properties | | |
| Shore Hardness[1] | | |
| A | 98 | 93 |
| D | 82 | 75 |
| Tensile Strength[2], psi | 6551 | 5684 |
| Elongation[2], % | 30 | 45 |
| Flexural Modulus[3] psi- | | |
| 20° F. | 317,100 | 264,500 |
| 70° F. | 215,800 | 149,000 |
| 158° F. | 53,200 | 97,700 |
| Flexural Ratio-20/158 | 6.0 | 2.7 |
| Heat Sag[4], in. | 0.6 | 0.3 |

Notes:
[1] ASTM D-2240-75
[2] ASTM D-412-75
[3] ASTM D-790-71 (Method I)
[4] The test specimen (1 in × 5 in) is set in a 4 in hang at 250° F. for 1 hour and the decline distance is measured.

The data show that the use of hydroxyalkylmelamine almost doubles the high temperature stiffness of the elastomer and also greatly reduces the heat sag.

EXAMPLES 2–4

Molded elastomers were prepared according to the following compositions:

| | Parts | | |
| --- | --- | --- | --- |
| Material | 2 | 3 | 4 |
| Modified diphenylmethane diisocyanate[1] | 96 | 82 | 71 |
| Polyol[2] | 70 | 70 | 70 |
| Hydroxypropylmelamine | 5 | 10 | 15 |
| 1,4 Butanediol | 25 | 20 | 15 |
| Dibutyltin dilaurate[3] | 0.04 | 0.02 | — |

Notes:
[1] Isonate 191, Upjohn isocyanate index 115
[2] Pluracol 380, BASF
[3] T-12, M & T Chemicals Properties of the resulting elastomers are given in TABLE II.

TABLE II

| Melamine Polyol Elastomers | 2 | 3 | 4 |
|---|---|---|---|
| Processing | | | |
| Mixing Temp, °C. | 23 | 23 | 23 |
| Pot Life, sec | 10 | 7 | 5 |
| Cured Mold, min/°C. | 10/120 | 60/120 | 60/120 |
| Physical Properties | | | |
| Shore Hardness[1] | | | |
| A | 95 | 96 | 96 |
| D | 60 | 62 | 63 |
| Tensile Strength[2], psi | 2577 | 3072 | 3280 |
| Elongation, % | 62 | 49 | 28 |
| Flexural Modulus[3], psi- | | | |
| 20° F. | 316,800 | 156,600 | 376,500 |
| 70° F. | 304,800 | 101,800 | 337,900 |
| 160° F. | 127,600 | 73,300 | 210,400 |
| Flexural Modulus Ratio, 20/160 | 2.5 | 2.0 | 1.6 |
| Heat Sag, in | 1.6 | 1.1 | 0.8 |

Notes:
[1] ASTM D-2240-75;
[2] ASTM D-412-75
[3] ASTM D-790-71 (Method 1)
[4] Copy from Table I The data show the beneficial effect of hydroxyalkyl melamine on improving the stiffness retention at high temperature, reducing heat sag, and also demonstrate the catalytic effect of hydroxyalkylmelamine when used to replace part of all of the conventional tin catalyst.

EXAMPLE 5

A molded elastomer is prepared according to Example 1 except that the amount of diisocyanate is adjusted to give an isocyanate index of 150. The resulting elastomer has a heat sag value of 1.7 inches compared to a value of 2-8 for a control containing no hydroxypropylmelamine and twice the amount of short chain diol. The modulus ratio is similarly reduced from 5.5 to 5.1 with the addition of hydroxypropylmelamine.

We claim:

1. A reaction injection molding composition comprising a polyisocyanate, a polymeric polyol, a short chain diol and a hydroxyalkylmelamine, the total hydroxyl content of the polymeric polyol, the short chain diol and the hydroxyalkylmelamine, being about equal to the stoichiometric requirements of said isocyanate, up to an isocyanate index of about 300, the polymeric polyol comprising the major weight proportion of the combination of polymeric polyol, short chain diol and hydroxyalkylmelamine and said hydroxyalkylmelamine comprising from about one fifth to about twice the weight content of short chain diol.

2. The composition of claim 1 wherein said hydroxyalkylmelamine is a hydroxypropylmelamine of hydroxyl number between about 400 and 550.

3. The composition of claim 1 wherein said hydroxyalkylmelamine comprises from about one-half to about twice the weight content of short chain diol.

4. A process for manufacturing a shaped article which comprises preparing a reactive mixture of the composition of claim 1, shaping said mixture in a heated mold under pressure, and curing the shaped article.

5. The process of claim 4 wherein said hydroxyalkylmelamine is a hydroxypropylmelamine of hydroxyl number between about 400 and 550.

6. The process of claim 4 wherein said hydroxyalkylmelamine comprises from about one-half to about twice the weight content of short chain diol.

* * * * *